United States Patent
Koga

(10) Patent No.: US 12,286,187 B2
(45) Date of Patent: Apr. 29, 2025

(54) OPERATION HANDLE STRUCTURE OF DEVICE

(71) Applicant: HONDA MOTOR CO., LTD., Tokyo (JP)

(72) Inventor: Futoshi Koga, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 108 days.

(21) Appl. No.: 18/277,590

(22) PCT Filed: Feb. 28, 2022

(86) PCT No.: PCT/JP2022/008285
§ 371 (c)(1),
(2) Date: Aug. 17, 2023

(87) PCT Pub. No.: WO2022/196325
PCT Pub. Date: Sep. 22, 2022

(65) Prior Publication Data
US 2024/0124088 A1   Apr. 18, 2024

(30) Foreign Application Priority Data
Mar. 15, 2021 (JP) .................................. 2021-041621

(51) Int. Cl.
*B62J 50/21* (2020.01)
*B62J 45/00* (2020.01)
*B62K 21/26* (2006.01)

(52) U.S. Cl.
CPC ............... *B62J 50/21* (2020.02); *B62J 45/00* (2020.02); *B62K 21/26* (2013.01)

(58) Field of Classification Search
CPC ... B62J 50/21; B62J 45/00; B62J 11/19; B62J 50/22; B62K 21/26; B62K 11/14;
(Continued)

(56) References Cited

U.S. PATENT DOCUMENTS 7,798,814 B2 * 9/2010 Makuta .................. G09B 9/058
434/61
2010/0259417 A1 * 10/2010 Nieves ..................... B60Q 9/00
340/901

(Continued)

FOREIGN PATENT DOCUMENTS

| JP | 2002-113264 | 4/2002 |
|---|---|---|
| JP | 2007-112316 | 5/2007 |
| JP | 2016-068769 | 5/2016 |

OTHER PUBLICATIONS

Japanese Office Action for Japanese Patent Application No. 2023-506934 dated May 28, 2024.
(Continued)

*Primary Examiner* — Adnan Aziz
(74) *Attorney, Agent, or Firm* — Amin, Turocy & Watson, LLP

(57) ABSTRACT

This operation handle structure of a device includes a grip (41A, 51A) capable of operating a device (1) and grasped by an operator; and a vibration device (46, 56) that transmits vibration to the grip (41A, 51A) and informs the operator of information. The vibration device (46, 56) is located on a side of an end portion (37e) of the grip (41A, 51A). The vibration device (46, 56) is provided with an actuator (71) and an eccentric weight (72) and is located in a hollow portion (37c) inside the grip (41A, 51A).

4 Claims, 5 Drawing Sheets

(58) Field of Classification Search
CPC ...... B62K 23/04; B60R 16/027; B60W 50/16; B60W 2300/36; B60Q 9/00
See application file for complete search history.

(56) References Cited

U.S. PATENT DOCUMENTS

| | | | |
|---|---|---|---|
| 2012/0067659 A1* | 3/2012 | Ogura .................... | B62K 11/10 180/65.6 |
| 2013/0021144 A1* | 1/2013 | Hamachi ................ | B62D 1/046 340/425.5 |
| 2016/0258758 A1* | 9/2016 | Houston ................ | G01D 5/145 |
| 2017/0267171 A1 | 9/2017 | Sweney | |
| 2018/0156631 A1* | 6/2018 | Huard .................... | B62K 21/26 |
| 2020/0039536 A1* | 2/2020 | Okada .................... | B62D 1/06 |
| 2020/0269868 A1 | 8/2020 | Giraud | |

OTHER PUBLICATIONS

International Search Report and Written Opinion for International Application Serial No. PCT/JP2022/008285 mailed on May 10, 2022, 8 pages.

* cited by examiner

OPERATION HANDLE STRUCTURE OF DEVICE

TECHNICAL FIELD

The present invention relates to an operation handle structure of a device.

Priority is claimed on Japanese Patent Application No. 2021-041621 filed Mar. 15, 2021, the content of which is incorporated herein by reference.

BACKGROUND ART

In the past, a technology for presenting information to a driver through a sense of touch is known in a steering handle structure for motorcycles (see, for example, Patent Document 1). In this technology, vibrators are built into the left and right grips that the driver grasps, and the operation of these vibrators is controlled.

CITATION LIST

Patent Literature

[Patent document 1] Japanese Unexamined Patent Application, First Publication No. 2007-112316

SUMMARY OF INVENTION

Technical Problem

By the way, an operation handle of a device such as a vehicle may generate vibration due to transmission of vibration of the device itself (vehicle body). In order to suppress this vibration, the following technology is well known to suppress grip vibration. The technique is to attach a handle weight to an end of a grip, etc., to suppress the amplification of vibration at the end of the grip.

However, mounting the above-mentioned transducer and handle weight together on a grip of limited size poses the following problems. That is, it is difficult to secure space for the placement of the parts, and the cost of the parts also increases.

The purpose of the present invention is to provide an operation handle structure for device that can efficiently notify information to an operator who grasps a grip and suppress vibration of the grip.

Solution to Problem

As a solution for the above problem, an aspect of the present invention is an operation handle structure of a device including: a grip (41A, 51A) capable of operating a device (1) and grasped by an operator; and a vibration device (46, 56) that transmits vibration to the grip (41A, 51A) and informs the operator of information, wherein the vibration device (46, 56) is located on a side of an end portion (37e) of the grip (41A, 51A).

According to this configuration, the vibration device that informs the operator of information can be used as a handle weight to suppress the vibration of the grip. Therefore, there is no need to provide with a handle weight separate from the vibration device. Therefore, the increase in a space where the handle and parts around the handle are disposed and the increase in cost of parts can be suppressed. Therefore, it is possible to efficiently notify information to the operator who grasps the grip and to suppress the vibration of the grip. The above "side of the end part" includes a circumference of the end part such an outside and inside of the end part.

In the above aspect, the vibration device (46, 56) may be provided with an actuator (71) and an eccentric weight (72) and is located in a hollow portion (37c) inside the grip (41A, 51A).

According to this configuration, since the vibration device that includes the actuator and the eccentric weight is used as the handle weight, there is no need to provide with a handle weight separate from the vibration device. Therefore, the increase in a space where the handle and parts around the handle are disposed and the increase in cost of parts can be suppressed. Therefore, it is possible to efficiently notify information to the operator who grasps the grip and suppress the vibration of the grip.

In the above aspect, a rotation axis (71a) of the actuator (71) may be disposed parallel to a center axis line (83) of the grip (41A, 51A).

According to this configuration, the actuator and the eccentric weight connected to the rotation axis of the actuator can be easily accommodated in the hollow portion inside the grip.

In the above aspect, a support portion (81d1, 81b1) supporting the actuator (71) in the grip (41A, 51A) on a side where the operator is located, from the center axis line (83) of the grip (41A, 51A) may further be included.

According to this configuration, by providing the support portion of the actuator on the operator side of the grip, the vibration of the vibration device is more easily transmitted to the hand grasping the grip. Therefore, the notification of information to the operator can be performed better.

In the above aspect, the grip (41A, 51A) may be provided with a left-and-right-pair of grips (41A, 51A) to be grasped by left and right hands of the operator respectively, and the eccentric weight (72) may be disposed on an inner side of the grip (41A, 51A) in a left-right direction from the actuator (71).

According to this configuration, since the eccentric weight is disposed on the inner side (base end side) of the grip in the left-right direction, the notification of information to the operator can be performed better. That is, the vibration caused by the rotation of the eccentric weight can be transmitted to the hand grasping the grip more easily than when the eccentric weight is disposed on the outer side (tip end side) of the grip in the left-right direction.

In the above aspect, a harness (76) disposed inside the grip (41A, 51A) and connected to the actuator (71) may further be included.

According to this configuration, since the harness connected to the actuator is disposed inside the grip, disturbances such as water exposure to the harness can be suppressed. In addition, the harness can be made inconspicuous to improve its appearance.

Advantageous Effects of Invention

According to the present invention, it is possible to provide an operation handle structure for device that can efficiently notify information to the operator who grasps the grip and suppress vibration of the grip.

DESCRIPTION OF EMBODIMENTS

The following is a description of an embodiment of the invention with reference to figures. In the following description, the orientation of the front, rear, left, right, etc. is the same as that of a vehicle described below, unless otherwise noted. Arrows FR, LH, and UP are shown at appropriate places in the figures used in the following explanation to indicate a front of the vehicle, a left of the vehicle, and a top of the vehicle, respectively.

<Overall Vehicle>

Figure 1:
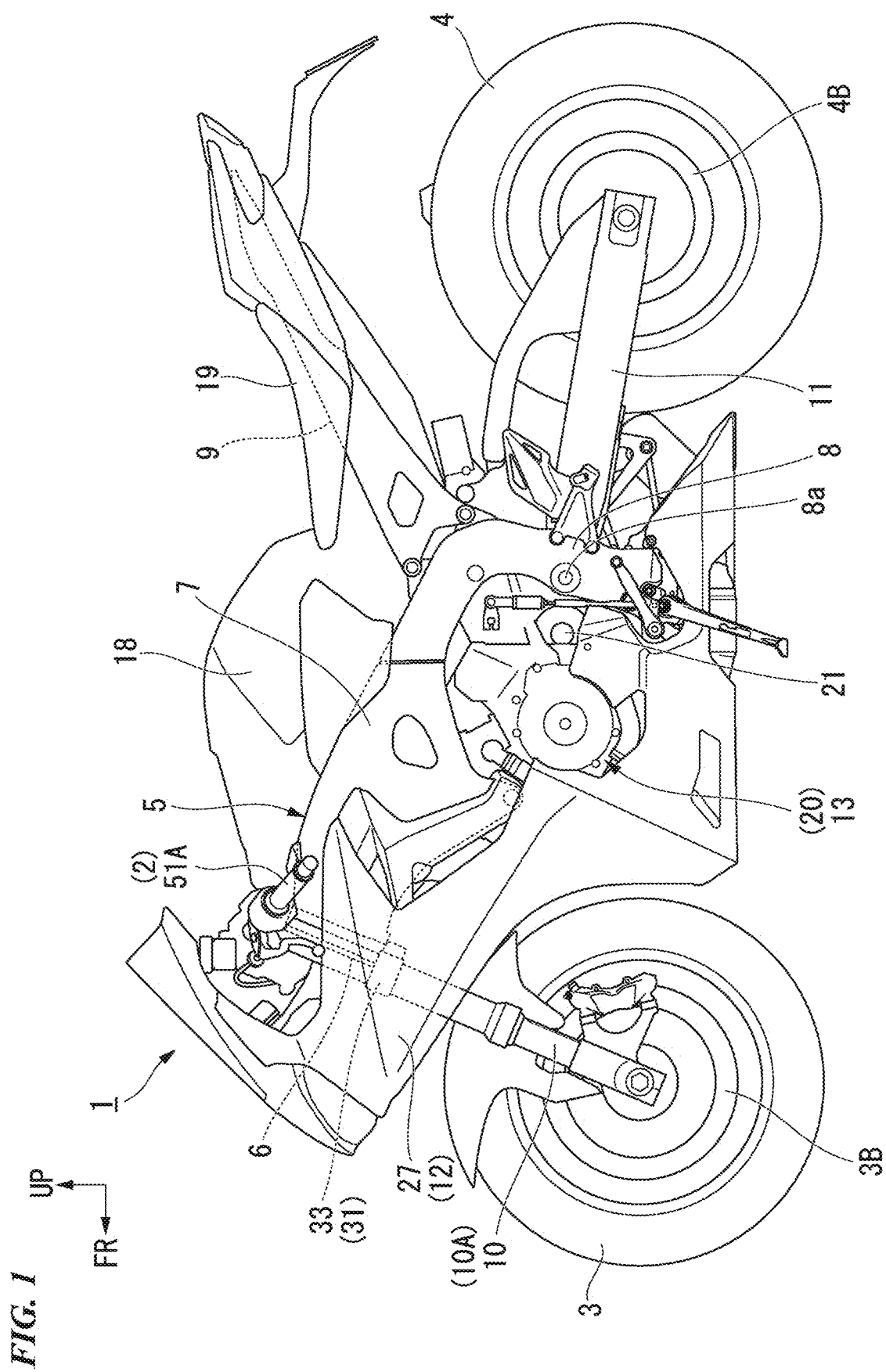
FIG. 1 is a left side view of a motorcycle of an embodiment of the present invention.

FIG. 1 shows a motorcycle (device) 1 of the present embodiment. The motorcycle 1 has a front wheel 3 that is steered by a handlebar (operation handle) 2 and a rear wheel 4 that is driven by a power unit 20. The motorcycle 1 is a saddle-riding vehicle in which a driver straddles a vehicle body. The motorcycle 1 can swing (bank) its body in the left-right direction (roll direction) with respect to the ground contact points of the front and rear wheel 3, 4. The vehicle of the embodiment is a vehicle that turns in the direction in which the vehicle body is banked like the motorcycle, but is not limited to this. The vehicle of the embodiment may include a vehicle that turns by steering the handlebars without banking the vehicle body.

The motorcycle 1 is provided with steering system parts 10A including the handlebar 2 and the front wheel 3, and a vehicle body frame 5, which serves as a framework of the motorcycle 1. The steering system parts 10A is supported by a head pipe 6 at the front end portion of the vehicle body frame 5 so as to be steered. The front wheel 3 is supported by the lower ends of a left and right pair of front forks 10 in the steering system parts 10A. The circumference of the vehicle body frame 5 is covered by a vehicle body cover 12.

The vehicle body frame 5 includes the head pipe 6, a left and right pair of main frames 7, a left and right pair of pivot frames 8, and a left and right pair of seat frames 9.

The head pipe 6 supports the steering system parts 10A so as to be steered. The left and right main frames 7 extend backward and downward from the head pipe 6. The left and right pivot frames 8 extend downward from each rear end portion of the left and right main frames 7, respectively. The left and right seat frames 9 extend backward and upward from each upper portion of the left and right pivot frames 8.

A pivot shaft 8a is passed at the left and right pivot frames 8 along a vehicle width direction (a left-right direction of the vehicle body, hereinafter simply referred to as the left-right direction). A front end portion of a swing arm 11, is supported by the left and right pivot frames 8 via the pivot shaft 8a so as to be swung vertically. The rear wheel 4 is supported by a rear end portion of the swing arm 11.

A cushion unit (not shown), which is a buffer, is passed between the vehicle body frame 5 and the swing arm 11.

A fuel tank 18 is supported on an upper portion of the left and right main frames 7. Behind the fuel tank 18, a seat 19 is supported by the left and right seat frames 9.

The power unit 20 of the motorcycle 1 is supported by the left and right main frames 7 and the left and right pivot frames 8. An output shaft of the power unit 20 is connected to the rear wheel 4 through a chain-type transmission mechanism (not shown) to enable power transmission.

The power unit 20 is integrally provided with an engine 13 as a prime mover and a transmission 21 connected to the rear of the engine 13.

The motorcycle 1 is provided with a front wheel brake 3B for braking the front wheel 3 and a rear wheel brake 4B for braking the rear wheel 4. The front wheel brake 3B and the rear wheel brake 4B are each disc brakes.

The front wheel brake 3B and the rear wheel brake 4B brake the rotation of the front wheel 3 and the rear wheel 4, as appropriate. This braking is done by operating a brake lever 43 (see FIG. 2) and a brake pedal (not shown), which are brake operators.

Figure 2:
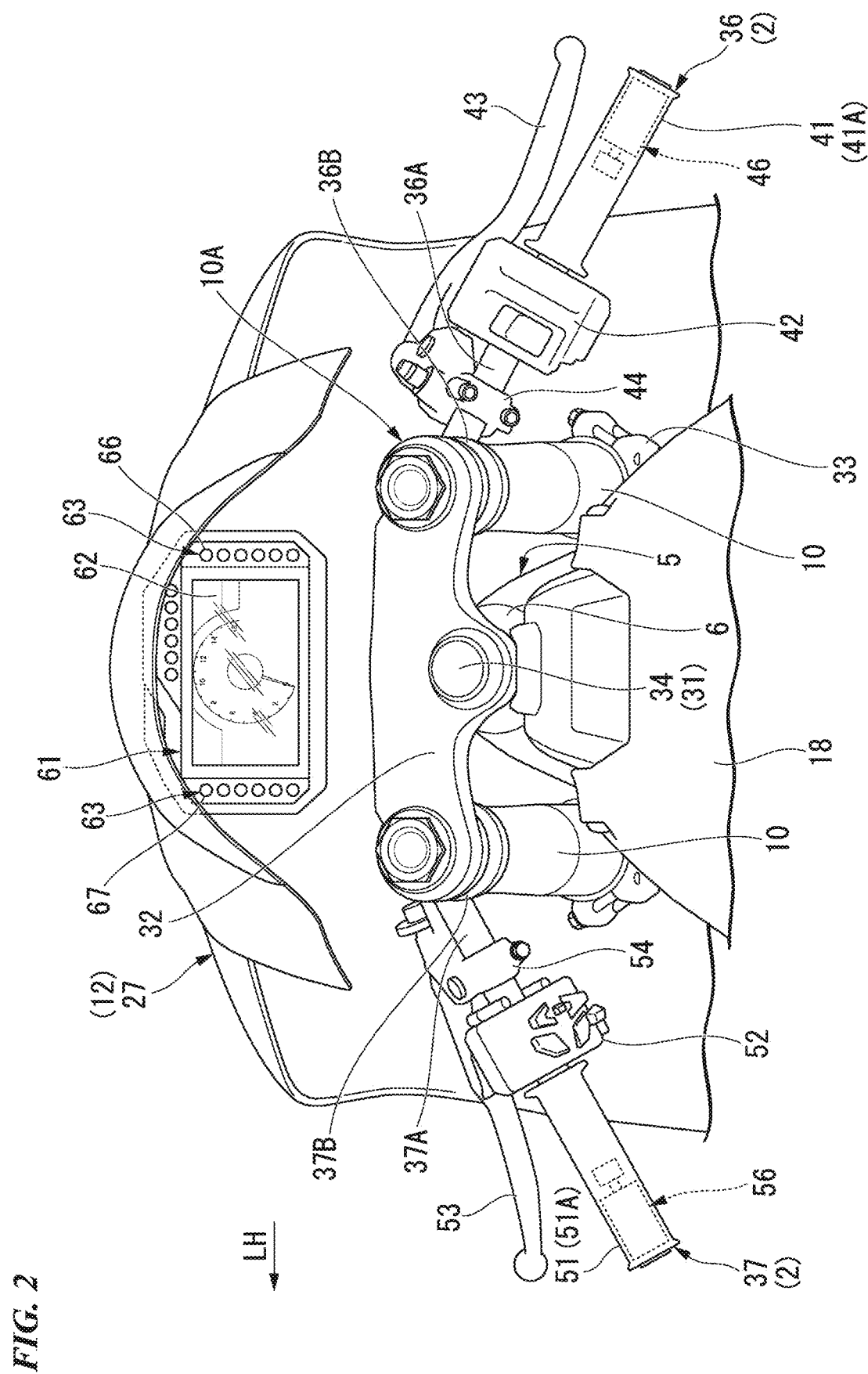
FIG. 2 is an oblique view of an area around handlebars of the above motorcycle, as seen from a driver's perspective.

FIG. 2 shows an area around the handlebars 2 at the front portion of the vehicle body as seen from the driver's perspective. The upper portions of the left and right front forks 10 are supported by the head pipe 6 via a steering stem 31. The left and right front forks 10 are telescopic buffers. The steering stem 31 has a top bridge 32 and a bottom bridge 33, and a stem shaft 34. The top bridge 32 and the bottom bridge 33 connect the upper portions of the left and right front forks 10. The stem shaft 34 is inserted into the head pipe 6. The front portion of the vehicle body is covered by the front cowl 27 of the vehicle body cover 12.

For example, the handlebar 2 of the motorcycle 1 is a separate left and right handle. The handlebar 2 has a left and right pair of a right handle 36 and a left handle 37. For example, the right handle 36 and the left handle 37 are each attached to the upper portion of the front fork 10 on the same side below a top bridge 32.

The right handle 36 is provided with a right grip 41A that the driver grasps with his/her right hand. The right grip 41A has a cylindrical right grip bar 36A that extends in a straight line with a length in the vehicle width direction and an accelerator sleeve 41 that is externally fitted to the right grip bar 36A in a rotatable manner around its axis. The right grip bar 36A is composed of a metal pipe or the like. The accelerator sleeve 41 is composed of a rubber grip fixedly attached to a periphery of a synthetic resin main body.

The right grip bar 36A extends inwardly in the vehicle width direction from the accelerator sleeve 41. A right switch box 42 and a right lever holder 44 are supported on the inner side of the right grip bar 36A in the vehicle width direction. A reference 43 in the figure indicates a right lever (e.g., a front brake lever) pivotably supported by the right lever holder 44. An inner end portion of the right grip bar 36A in the vehicle width direction is secured to the top portion of the right front fork 10 via a right handle clamp 36B.

The right grip 41A is provided with a right vibration device 46 in an inner space (hollow portion) of the right grip bar 36A. The right vibration device 46 is used to provide vibration to the driver's right hand as an information notification.

The left handle 37 is provided with a left grip 51A that the driver grasps with his/her left hand. The left grip 51A has a cylindrical left grip bar 37A that extends in a straight line with a length in the vehicle width direction and a handle grip 51 that is fixedly attached to the left grip bar 37A. The left grip bar 37A is composed of a metal pipe or the like. The handle grip 51 is a synthetic rubber grip.

The left grip bar 37A extends inwardly in the vehicle width direction from the handle grip 51. A left switch box 52 and a left lever holder 54 are supported on the inner side of the left grip bar 37A in the vehicle width direction. A reference 53 in the figure indicates a left lever (e.g., a clutch lever). An inner end portion of the left grip bar 37A in the vehicle width direction is secured to the top of the left front fork 10 via a left handle clamp 37B.

The left grip 51A is provided with a left vibration device 56 in an inner space (hollow portion) of the left grip bar 37A. The left vibration device 56 is used to provide vibration to the driver's left hand as an information notification.

A meter device 61 is located in front of the front fork 10. The meter device 61 is supported by the vehicle body frame 5 or the front cowl 27. The meter device 61 is provided with a display screen 62 and an indicator lamp group 63. The meter device 61 is configured by, for example, a liquid crystal display that displays images of a vehicle speed and an engine speed. The indicator lamp group 63 is disposed around the display screen 62 to notify the driver of various information.

The indicator lamp group 63 is provided with a right indicator lamp 66 located on a right side of the display screen 62 and a left indicator lamp 67 located on a left side of the display screen 62. The right indicator lamp 66 emits light in conjunction with an activation of the right vibration device 46. The left indicator lamp 67 emits light in conjunction with an activation of the left vibration device 56. The display screen 62 notifies the driver of predetermined information by displaying predetermined images. The indicator lamp group 63 notifies the driver of predetermined information by performing a predetermined luminous display (lighting or blinking). The predetermined information includes, for example, various notifications and warnings, such as those related to an operation assist control and an automatic operation control of the motorcycle 1. The notification of indicator lamp group 63 is performed in cooperation with the left and right vibration devices 46, 56.

By the way, a saddle-riding vehicle such as the motorcycle 1 has a specific vibration such as vibration of the engine and other motive power, vibration caused by uneven road surfaces, vibration caused by tire imbalance, and the like. Therefore, vibrations using a general vibrator may be lost in the aforementioned peculiar vibrations, and the driver may not notice the warning.

The left and right vibration devices 46, 56 generate predetermined vibrations to notify and warn the driver. The left and right vibration devices 46, 56 generate vibrations as the aforementioned notification and warning in a frequency band that avoids vibration frequencies specific to the saddle-riding vehicle such as the motorcycle 1.

This makes it difficult for the vibrations as notifications and warnings to be blended in with the wheel vibration and engine vibration, etc., that are specific to the saddle-riding vehicle. This makes it possible to provide good notification of information that is easily perceived by the driver. The vibrations as notifications and warnings are so-called haptic vibrations. This vibration stimulates the tactile sense of the driver's hands that grasp the left and right grips 41A, 51A.

Figure 3:
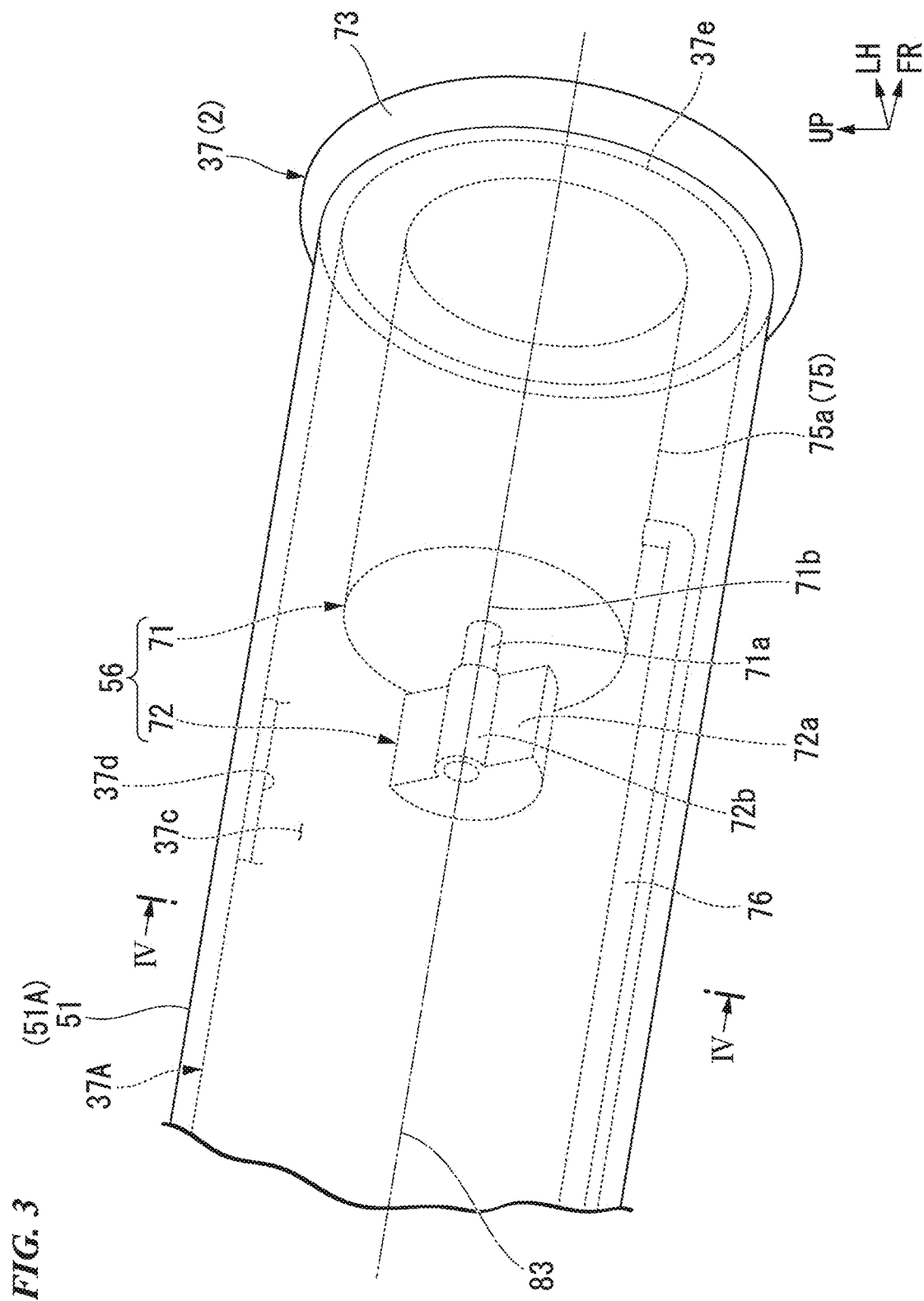
FIG. 3 is a diagram showing a structure of a left handle of the above motorcycle.

FIG. 3 is a perspective view showing transparently an inside of the left handle 37. Hereinafter, referring to FIG. 3, the left vibration device 56 located inside the left handle 37 is described below. In FIG. 3, the handle grip 51 (see FIG. 2) of the left handle 37 is omitted. A detailed description of the right vibration device 46 located inside the right handle 36 is omitted, since it has the same structure as the left vibration device 56 (the same applies to FIGS. 4 and 5).

The left vibration device 56 has an electric motor (actuator) 71 and an eccentric weight 72. The electric motor 71 is supported (fixed) on an inner circumference surface 37d of the hollow portion 37c of the left grip bar 37A. The eccentric weight 72 is integrally rotatable and supported on a tip end portion of a rotation axis 71a of the electric motor 71. A cap 73 is attached to an outer end portion 37e of the left grip bar 37a in the left-right direction to seal the hollow portion 37c. The entire left vibration device 56 is disposed inwardly in the left-right direction from a distal end of the end portion 37e of the left grip bar 37A. At least a part of the left vibration device 56 may be disposed outwardly in the left-right direction than the distal end of the end portion 37e of the left grip bar 37A. In this case, the left vibration device 56 may be configured to be covered with a suitable cap.

In the electric motor 71, driving, stopping and rotation speed of the rotation axis 71a are controlled. This control is performed by a control device (not shown) provided in the vehicle body based on various information. The electric motor 71 has a cylindrical housing 75 that covers an outer circumference around the rotation axis 71a.

For example, a wire harness 76 extends from an outer circumference surface 75a of the housing 75. The wire harness 76 has a plurality of conductors (not shown). The wire harness 76 supplies control signals from an unshown control device and power from an unshown battery to the electric motor 71.

The wire harness 76 is disposed to extend in the left grip bar 37A from the electric motor 71 to the inner side in the vehicle width direction. The wire harness 76 is drawn out of the left grip bar 37A near a left handle clamp 37B (see FIG. 2) and joins an unshown main harness.

For example, the eccentric weight 72 is formed in the shape of an abbreviated semi-cylinder. The eccentric weight 72 is aligned in the axial direction with the rotation axis 71a of the electric motor 71. The eccentric weight 72 is provided with a flat surface portion 72a along the axial direction and a shaft attachment portion 72b that fits the rotation axis 71a. The center of gravity of the eccentric weight 72 is eccentric with respect to the rotation axis 71a. The eccentric weight 72 rotates with the rotation axis 71a by operation of the electric motor 71 to generate vibration in the left vibration device 56. As a result, the left grip bar 37A on which the left vibration device 56 is mounted vibrates, and the vibration is transmitted to the left hand of the driver holding the handle grip 51. This vibration notifies the driver of predetermined information.

By installing the weighted electric motor 71 and the eccentric weight 72 within the hollow left grip bar 37A, the following effect is achieved. That is, the left vibration device 56 can be used as a handle weight to suppress vibration generation due to resonance of the left handle 37. Therefore, a separate handle weight does not need to be installed on the left handle 37, and there is no need to add space for parts placement inside and around the left handle 37. In addition, the increase in the number of parts and mounting structure can be suppressed and cost reduction can be ensured.

The eccentric weight 72, which is the source of vibration of the left vibration device 56, is located at an inner side of the left handle 37 in the left-right direction. The inner side of the left handle 37 in the left-right direction is a thumb side of the driver's hand. The thumb side of the driver's hand is a side that the driver's hand tends to be in constant contact with, even if the fingers operating the lever in front of the left handle 37 are separated from the left handle 37. Therefore, by disposing the eccentric weight 72 on the inner side of the left handle 37 in the left-right direction, vibration is more easily transmitted to the driver's hand.

For example, the weight of the electric motor 71 is heavier than that of the eccentric weight 72. The electric motor 71 is disposed at an outer side of the eccentric weight 72 in the vehicle width direction. By disposing the weighted electric motor 71 at an outer side of the left handle 37 in the left-right direction (a distal end side), the following effect is achieved. That is, the left vibration device 56 can easily function as a handle weight, and the effect of suppressing vibration of the left handle 37 is enhanced.

Figure 4:
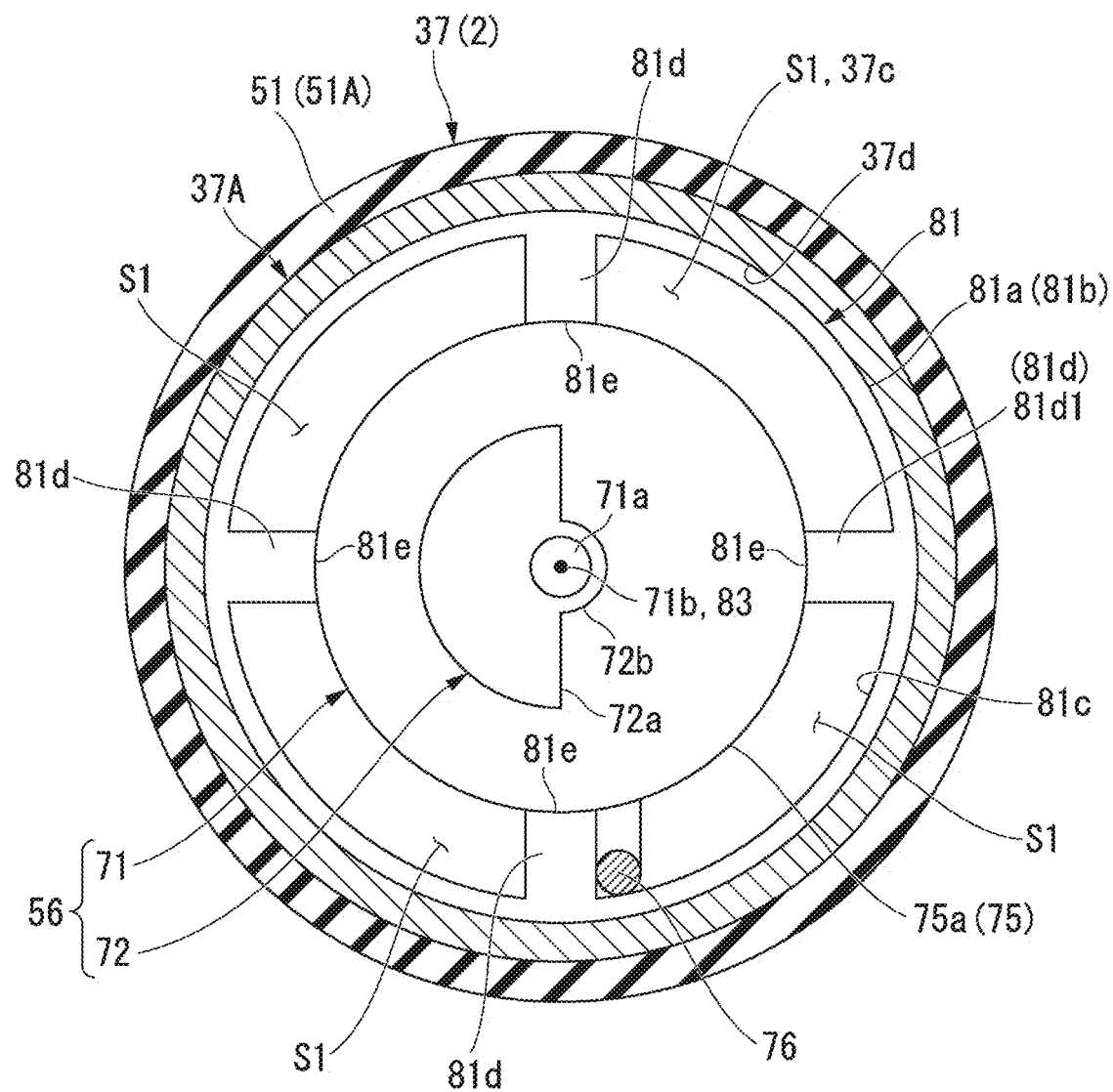
FIG. 4 is a cross-sectional view of an IV-IV line of FIG. 3.

As shown in FIG. 4, the electric motor 71 is supported (fixed) to the inner circumference surface 37d of the left grip bar 37A via a spacer 81.

For example, the spacer 81 has a cylindrical shape coaxial with the left grip bar 37A. The spacer 81 has its outer circumference surface 81a fitted to the inner circumference surface 37d of the left grip bar 37A. The spacer 81 has a cylindrical peripheral wall 81b forming the outer circumference surface 81a and a plurality of inwardly protruding portions 81d protruding inwardly in a radial direction from the inner circumference surface 81c of the peripheral wall 81b.

The plurality of inwardly protruding portions 81d hold the electric motor 71 by pressing an inner end surface 81e in the radial direction against the outer circumference surface 75a of the housing 75 of the electric motor 71. In other words, the spacer 81 holds the electric motor 71 by fitting the electric motor 71 inside each inner end surface 81e. A space S1 extending along the axial direction of the left grip bar 37A is provided between the circumferentially adjacent inwardly protruding portions 81D. This space S1 promotes heat dissipation from the electric motor 71.

Between the left grip bar 37A and the spacer 81, there is a baffle (not shown) that prevents relative rotation in the circumferential direction. The same baffle is also provided between the spacer 81 and the housing 75.

A reference sign 83 in the figure indicates a center axis line (shaft center) passing through the center of the cross portion of the left grip bar 37A, which extends in a straight line. A reference sign 71b in the figure indicates the center axis line (shaft center) of the rotation axis 71a of the electric motor 71. In the embodiment, these both center axis lines 83, 71b are coincident with each other. That is, the electric motor 71 is disposed with the axial direction parallel to and coaxial with the left grip bar 37A.

At least one of the plurality of inwardly protruding portions 81d is disposed on the rear side of the vehicle (driver's side) from the center axis line 83. This rear side inwardly protruding portion 81d is indicated by a reference sign 81d1. The rear side of the left handle 37 is a side that the driver's palm tends to be in constant contact with, regardless of whether the lever is operated or not. Therefore, by providing the support for the electric motor 71 (inwardly protruding portion 81d1) on the rear side of the left handle 37, vibration is more easily transmitted to the driver's hand.

The spacer 81 is made of resin or metal. When the left vibration device 56 serves as the handle weight, the material of spacer 81 may be selected according to the required weight. In other words, when the left vibration device 56 alone is sufficient to provide the weight required as the handle weight, the spacer 81 may be made of resin. When the left vibration device 56 alone is not sufficient to provide the weight required as the handle weight, the spacer 81 may be made of metal. When adjusting the weight of the handle weight with the metal spacer 81, for example, the thickness of the peripheral wall 81b and the cross-sectional area of the inwardly protruding portion 81d of the spacer 81 may be increased. When the spacer 81 is made of metal, good heat dissipation from the electric motor 71 is achieved by utilizing the good thermal conductivity of metal.

Figure 5:
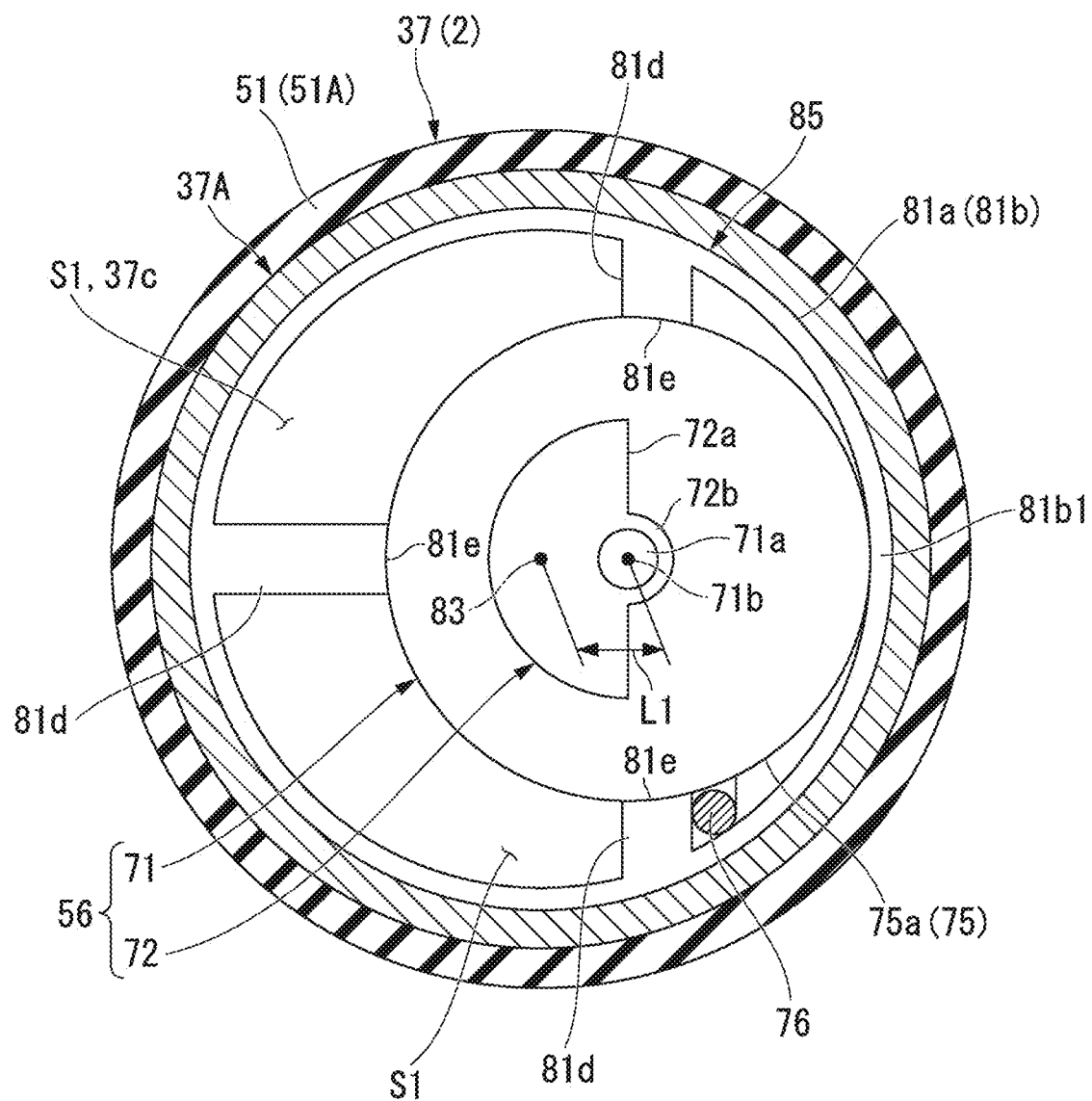
FIG. 5 is a cross-sectional view corresponding to FIG. 4 showing a modification of the above embodiment.

FIG. 5 shows an example in which the electric motor 71 is disposed eccentrically, in contrast to the embodiment shown in FIG. 4.

In this example, both the center axis lines 83, 71b of the left grip bar 37A and the electric motor 71 are parallel to each other. The center axis line 71b of the electric motor 71 is offset from the center axis line 83 of the left grip bar 37A by a distance L1 to the rear side.

The electric motor 71 is supported (fixed) to the inner circumference surface 37d of the left grip bar 37A via a spacer 85.

For example, the spacer 85 has a cylindrical peripheral wall 81b forming an outer circumference surface 81a, and a plurality of inwardly protruding portions 81d protruding inwardly in a radial direction from an inner circumference surface 81c of the peripheral wall 81b.

The spacer 85 has fewer inwardly protruding portions 81d than the spacer 81 of the embodiment. The spacer 85 does not support a rear portion of the outer circumference surface 75a of the housing 75 of the electric motor 71 by the inwardly protruding portions 81d. The spacer 85 supports the rear portion of the outer circumference surface 75a with a rear portion 81b1 of a peripheral wall 81b. The rear portion of the outer circumference surface 75a of the housing 75 of the electric motor 71 is pressed against the inner circumference surface 81c of the rear portion 81b1 of the peripheral wall 81b of the spacer 85. As a result, the vibration generated by the left vibration device 56 is directly transmitted to the driver's left hand.

Thus, by eccentrically disposing the electric motor 71 rearward in the left grip bar 37A, the vibration generated by the left vibration device 56 is more easily transmitted to the palm of the driver's hand.

As explained above, the operation handle structure of the device in the above embodiment is provided with the handlebar 2 that enables steering of the motorcycle 1. The handlebar 2 is provided with the right grip 41A and the left grip 51A, which are grasped by the driver, and the right vibration device 46 and the left vibration device 56, which are disposed in the hollow portion 37c inside each of the right grip 41A and the left grip 51A. The right vibration device 46 and the left vibration device 56 provide vibration as a predetermined information notification to the hand of the driver who grasps the right grip 41A and the left grip 51A. The right vibration device 46 and the left vibration device 56 are provided with the electric motor 71 and the eccentric weight 72, respectively. The right vibration device 46 and the left vibration device 56 each serve as the handle weight. The handle weights suppress vibrations in the frequency band specific to the motorcycle 1 in the right grip 41A and the left grip 51A.

According to this configuration, the right vibration device 46 and the left vibration device 56, which are provided with the electric motor 71 and the eccentric weight 72, are used as handle weights to suppress vibrations in the frequency band specific to the motorcycle 1, thus eliminating the need to provide separate handle weights from the right vibration device 46 and the left vibration device 56. Therefore, the increase in a space where the handle 2 and parts around the handle 2 are disposed and the increase in cost of parts can be suppressed. In addition, it is possible to efficiently notify information to the driver who grasps the right grip 41A and the left grip 51A and to suppress vibration of the right grip 41A and the left grip 51A.

In addition, in the operation handle structure of the device described above, the right vibration device 46 and the left vibration device 56 are provided with the electric motor 71 and the eccentric weight 72 driven by the electric motor 71. This makes it possible to easily secure the weight as the handle weight.

In addition, in the operation handle structure of the device described above, the rotation axis 71a of the electric motor 71 is disposed parallel and coaxial with the center axis line 83 of the right grip 41A and the left grip 51A. This makes it possible to easily accommodate the electric motor 71 and the eccentric weight 72 in the hollow portion 37c within the right grip 41A and left grip 51A. In addition, the turning radius of the eccentric weight 72 can be secured to the maximum extent.

In addition, in the operation handle structure of the above device, the support portion (the inwardly protruding portion 81D1, the rear portion 81B1 of the peripheral wall 81B) is provided on the side (the rear side) where the driver is located from the center axis line 83 in the right grip 41A and left grip 51A. The support portion supports the electric motor 71 on the right grip 41A and left grip 51A.

According to this configuration, the support portion of the electric motor 71 is provided on the driver's side of the right grip 41A and the left grip 51A to provide good information notification to the driver. In other words, the vibration of the right vibration device 46 and the left vibration device 56 can be easily transmitted to the hand grasping the right grip 41A and the left grip 51A.

In addition, in the operation handle structure of the device described above, the handlebar 2 configures the left and right pair of grips 41A, 51A, which are grasped by the left and right hands of the driver, respectively. The grips 41A, 51A are supported by the main body of the vehicle body at base end portions at the inner side in the vehicle left-right direction and extend outward from the base end portions in the left-right direction. The eccentric weights 72 are disposed on the inner side of the grips 41A, 51A in the left-right direction from the electric motor 71.

According to this configuration, since the eccentric weights 72 are disposed on the inner side (base end side) of the left and right grips 41A, 51A in the left-right direction, the information to the driver can be notified better than when the eccentric weights 72 are disposed on the outer side (tip end side) of the left and right grips 41A, 51A. In other words, the vibration caused by the rotation of the eccentric weights 72 can be easily transmitted to the hands grasping the left and right grips 41A, 51A.

In addition, in the operation handle structure of the device described above, the wire harness 76 is provided, which is disposed inside the grips 41A, 51A and connected to the electric motor 71. This allows for suppressing disturbances such as water exposure to the wire harness 76, etc., as well as making the wire harness 76 inconspicuous to improve its appearance.

The invention is not limited to the above embodiments. For example, the vibration device is not limited to those driven by an electric motor. For example, the vibration device may be configured with an actuator that generates driving force by pneumatic, hydraulic, magnetic means, and the like, and a weight driven by the actuator to generate vibration.

The eccentric weight is not limited to the configuration in which the eccentric weight is disposed at the inner side in the left-right direction from the electric motor. For example, the eccentric weight may be disposed at the outer side in the left-right direction from the electric motor. In this case, the eccentric weight is driven at the end side of the grip, which makes it easier to generate vibration as an information notice throughout the grip. It is also easier to adjust the weight of the eccentric weight to function as the handle weight.

The methods of fixing the spacer to the grip and fixing the electric motor to the spacer are not limited to the methods described in FIGS. 4 and 5. For example, the spacer may be fixed to the grip by screwing and swaging. The electric motor may be fixed to the spacer by screwing and swaging.

The handle to which this invention is applied is not limited to separate left and right handles. The handles may be a bar handle integrated with the left and right handles, and need not be a bar-type handle.

Vehicles to which the invention applies include passenger cars, buses, trucks, saddle-riding vehicles, motorized bicycles, bicycles, and ATVs. Saddle-riding vehicles include all vehicles in which the driver straddles the vehicle body, and include not only motorcycles (including motorized bicycles and scooter-type vehicles), but also three-wheeled vehicles (including vehicles with two wheels in the front and one in the rear as well as two wheels in the front and one in the rear) or vehicles with four wheels. It also includes vehicles that include an electric motor as a prime mover.

Although the present embodiment is applied to a vehicle, the invention is not limited to application to vehicles. For example, the invention may be applied to various types of transportation device, such as aircraft and ships, as well as construction and industrial machinery. Furthermore, the invention can be widely applied to device with operation handles other than vehicles, such as hand-pushed lawn mowers and sweepers.

The configuration in the above embodiment is an example of the invention, and various changes can be made without departing from the gist of the invention, such as replacing the component elements of the embodiment with well-known component elements.

REFERENCE SIGNS LIST

1 Motorcycle (device)
2 Handlebar (operation handle)
37c Hollow portion
37e End portion
41A Right grip (grip)
46 Right vibrator (vibration device)
51A Left grip (grip)
56 Left vibrator (vibration device)
71 Electric motor (actuator)
71a Rotation axis
71b Center axis line
72 Eccentric weight
76 Wire harness (drive source supply member)
83 Center axis line

What is claimed is:

1. An operation handle structure of a vehicle comprising:
a grip configured to operate the vehicle and grasped by an operator; and
a vibration device that transmits vibration to the grip and informs the operator of information,
wherein the vibration device is located on a side of an end portion of the grip,
wherein the vibration device is provided with an actuator and an eccentric weight and is located in a hollow portion inside the grip, and
wherein the grip is provided as a left-and-right-pair of grips to be grasped by left and right hands of the operator respectively, and
the eccentric weight is disposed on an inner side of the grip in a left-right direction from the actuator.

2. The operation handle structure of the vehicle according to claim 1, wherein a rotation axis of the actuator is disposed parallel to a center axis line of the grip.

3. The operation handle structure of the vehicle according to claim 1, further comprising a support portion supporting the actuator in the grip on a side where the operator is located, from the center axis line of the grip.

4. The operation handle structure of the vehicle according to claim 1, further comprising a harness disposed inside the grip and connected to the actuator.

* * * * *